United States Patent
Yasuda et al.

[11] Patent Number: 5,984,357
[45] Date of Patent: Nov. 16, 1999

[54] SEAT BELT PRE-TENSIONER ASSEMBLY

[75] Inventors: Shigeru Yasuda; Hiroyoshi Yamaguchi; Eiji Shimizu; Tomoharu Ohi, all of Yokohama, Japan

[73] Assignee: NHK Spring Co., Ltd., Kanagawa, Japan

[21] Appl. No.: 08/847,272

[22] Filed: Apr. 30, 1997

[30] Foreign Application Priority Data

Dec. 27, 1996 [JP] Japan .................................. 8-350231
Dec. 27, 1996 [JP] Japan .................................. 8-350702

[51] Int. Cl.⁶ .................................................. B60R 22/46
[52] U.S. Cl. ........................................... 280/806; 297/480
[58] Field of Search ........................... 280/806; 297/480; 242/374; 60/632, 635, 638; 188/371, 374

[56] References Cited

U.S. PATENT DOCUMENTS

| | | | |
|---|---|---|---|
| 4,705,296 | 11/1987 | Andersson et al. | 280/806 |
| 5,039,127 | 8/1991 | Fohl | 280/806 |
| 5,152,552 | 10/1992 | Ikegaya | 280/806 |
| 5,651,564 | 7/1997 | Isaji et al. | 280/806 |

FOREIGN PATENT DOCUMENTS

| | | | |
|---|---|---|---|
| 5-254395 | 10/1993 | Japan | 280/806 |
| 2180734 | 4/1987 | United Kingdom | 280/806 |
| 2228182 | 8/1990 | United Kingdom | 280/806 |

*Primary Examiner*—Peter C. English
*Attorney, Agent, or Firm*—Skjerven, Morrill, MacPherson, Franklin & Friel LLP

[57] ABSTRACT

In a pre-tensioner assembly for automatically increasing a tension of a seat belt in case of a vehicle crash, an arm is pivotally attached to a base plate at its one end and to a part of a seat belt, and a cylinder and piston device is attached to the base plate to selectively rotate the arm from a rest position to an operative position. Typically, the cylinder and piston device comprises a linear cylinder having a propellant placed in a bottom end thereof. The rotary arm for displacing a buckle or other part of the seat belt can be substantially directly connected to the piston of the actuator, and because the piston rod is pushed out of the cylinder when actuating the rotary arm, the pressure receiving surface of the piston can be maximized. Therefore, the power transmission efficiency is improved, and the required amount of the propellant can be reduced with the result that the size and the cost of the assembly can be minimized.

7 Claims, 11 Drawing Sheets initial locking plastic deformation under target load initial locking plastic deformation under target load

SEAT BELT PRE-TENSIONER ASSEMBLY

TECHNICAL FIELD

The present invention relates to a pre-tensioner assembly for automatically increasing a tension of a seat belt in case of a vehicle crash.

BACKGROUND OF THE INVENTION

A vehicle seat is generally equipped with a seat belt assembly for restraining the vehicle occupant for preventing the vehicle occupant from being thrown forward in case of a vehicle crash. A seat belt assembly normally includes a retractor assembly incorporated with an emergency locking device (ELR device) which normally does not restrain the vehicle occupant but locks up the winding shaft of the seat belt only at the time of a sudden stop or a vehicle crash. An ELR device can lock up the winding shaft in an extremely short period of time after detecting a deceleration exceeding a prescribed threshold level, and prevent the seat belt from being paid out any further.

However, simply locking up the winding shaft is not sufficient for preventing a small length of the seat belt to be paid out because of an inevitable amount of slack or looseness of the part of the seat belt wound around the winding shaft. In view of this fact, a device called "pre-tensioner" has been proposed to increase the restraining capability of the seat belt by positively pulling the seat belt buckle to which the seat belt is attached at the time of a vehicle crash (see U.S. Pat. No. 4,705,296). In such pre-tensioners, the use of high pressure gas generated from a chemical reaction, and a resilient force of a spring has been customary.

When a piston is actuated by chemically produced high pressure gas, and the resulting thrust is transmitted to the buckle via a length of cable, a relatively high tension is applied to the cable, and the tensile strength of the cable has to be accordingly great. However, cable having a high tensile strength tends to have a high rigidity, and therefore tends to oppose a force to bend it. It means an increase in the resistance in pulling the cable along a tortuous path, and an increase in the necessary amount of the chemical agent for producing the gas. This is not desirable not only from the view point of cost but also because of a large amount of combustion gas which is produced from the combustion of the chemical agent, and is known to be highly unpleasant for the vehicle occupant. When the resilient force of a spring member is employed for pulling the seat-belt buckle, in order to meet a speed requirement, the spring member has to have a high rigidity, and tends to be large in size. Also, the assembly work tends to be troublesome.

Also, to avoid yielding of the seat belt or the buckle once it has been rapidly pulled, a pre-tensioner device is typically incorporated with a reversal preventing device such as a ratchet mechanism or a one-way clutch in addition to an ELR device. However, although it is essential to restrain the vehicle occupant from being thrown forward by the impact of a vehicle crash, it is desired that the impact acting upon the vehicle occupant may be no more than the level which the vehicle occupant is capable of safely taking because in case of a relatively large crash impact, if the seat belt or the buckle is firmly locked up after it has been rapidly pulled, the full force of the impact of the crash is applied to the vehicle occupant with the exception of a certain amount of impact absorbed by the slight elongation of the seat belt itself. Similarly, a seat recliner assembly is normally adapted to firmly lock up at selected positions, but it may be desirable if the assembly is capable of absorbing some of the impact of a vehicle crash by increasing the reclining angle at a controlled rate while absorbing the crash impact.

BRIEF SUMMARY OF THE INVENTION

In view of such problems of the prior art, a primary object of the present invention is to provide a seat belt pre-tensioner assembly which can achieve a sufficient high operation speed by using a relatively small amount of gas.

A second object of the present invention is to provide a seat belt pre-tensioner assembly which is compact in size and economical to manufacture.

A third object of the present invention is to provide a seat belt pre-tensioner assembly having a one-way clutch which can reliably prevent a reversing movement up to a prescribed load and keep the load below the prescribed level by using a simple structure.

A fourth object of the present invention is to provide a seat belt pre-tensioner assembly which is capable of not only reliably restraining the vehicle occupant but also absorbing some of the impact of a crash which is applied to the vehicle occupant.

According to the present invention, these and other objects of the present invention can be accomplished by providing a pre-tensioner assembly for automatically increasing a tension of a seat belt in case of a vehicle crash, comprising: a base plate for securing the entire assembly to a part near a side of a seat; an arm having one end pivotally attached to the base plate at a pivot center and another end attached to a part of a seat belt; a cylinder and piston device attached to the base plate and adapted to rotate the arm from a rest position to an operative position; and a reversal preventing device for restricting a rotational direction of the arm to be from the rest position to the operative position. Typically, the cylinder and piston device comprises a linear cylinder having a propellant placed in a bottom end thereof, and a piston slidably received in the cylinder and having a working end engaged to a part of the arm radially spaced from the pivot center of the arm.

Thus, the rotary arm for displacing a buckle or other part of the seat belt can be substantially directly connected to the piston of the actuator, and because the piston rod is pushed out of the cylinder when actuating the rotary arm, the pressure receiving surface of the piston can be maximized. Therefore, the power transmission efficiency is improved, and the required amount of the propellant can be reduced with the result that the size and the cost of the assembly can be minimized.

For an efficient transmission of a force produced by a piston pushed out of a cylinder, the working end may be connected to the radially spaced part of the arm via a link which is pivotally attached to both the arm and the working end of the piston so that the link member transmits a tensile force from the working end to the radially spaced part of the arm. The two ends of the link are pivotally attached to the working end and the arm, respectively, via pins. The moment applied to the pin can be minimized if the cylinder is attached to the base plate, and the link comprises a pair of link members which extend along either side of the base plate. Typically, the working end of the piston is attached to an intermediate point of a pin passed through the two link members at the associated end.

To further ensure the mechanical integrity of the link and the arm at the time of rapid actuation of the arm, a pin pivotally joining the arm to the link members may be engaged by an arcuate slot formed in the base plate. Also, to avoid any excessive load from being applied to other parts of the assembly when the piston is fully pushed out of the cylinder, the arcuate slot may have at least one end which defines an end of a rotational angular range of the arm.

Instead of using a link for transmitting the movement of the working end of the piston to the arm, it may be so arranged that the working end abuts the radially spaced part of the arm, and the working end thereby pushes the radially spaced part of the arm.

When the assembly is actuated, a substantial reaction force must be supported by the base plate. To reduce such a reaction, in particular which tends to bend the base plate, it is preferred to form the pivot center with a hollow shaft adapted to pass a fastening member therethrough for mounting the base plate to the part near a side of a seat. Thus, the necessary thickness of the base plate can be minimized, and this contributes to the compact and light-weight design of the assembly.

The reversal preventing device prevents slacking of the seat belt even after the power of the cylinder and piston device is all used up, and allows the vehicle occupant to be restrained in a desired manner. However, when the impact which is applied to the vehicle occupant is significantly great or is greater than the vehicle occupant can safely take, it is then desirable that the seat belt yields to the force applied thereto by the inertia of the vehicle occupant while applying a certain resistance to this yielding movement so that the impact energy may be favorably absorbed, and the maximum deceleration which is applied to the vehicle occupant may be minimized.

According to a preferred embodiment of the present invention, such an end can be accomplished by an arrangement in which the reversal preventing device comprises first and second members which are attached to sides of the arm and the base plate, a slot being defined between the first and second members, a ball or a roller received in the slot, and a spring member urging the ball or roller in one direction inside the slot, the slot being tapered in such a manner that a relative movement between the first and second members resulting from a rotation of the arm from the operative position to the rest position causes the ball or roller to move to a narrower part of the slot, and the spring member urges the ball or roller toward the narrower part of the slot; the slot being provided with a shape and/or a taper angle so that a movement of the arm from the operative position to the rest position is permitted against a resistance produced by a friction between the ball or roller and at least one of the first and second members, while a movement of the arm from the rest position to the operative position is freely permitted.

Instead of friction, plastic deformation of the ball or roller and/or at least one of the first and second members may be utilized for absorbing the energy of the crash impact and reducing the maximum deceleration which is applied to the vehicle occupant.

Such a one-way clutch arrangement can be most readily implemented if the movement between the first and second members consists of a rotary movement.

Instead of the above described one-way clutch arrangement, the reversal preventing device may comprise a ratchet mechanism including saw-tooth shaped teeth formed in a member integral with the base plate concentrically to the pivot center, and a pawl member pivotally attached to the arm and resiliently urged toward the teeth. In this case, to minimize the moment which is applied to pivotally supporting the pawl, the arm may comprise a pair of members extending substantially parallel to each other, and the pawl is pivotally attached to the arm between the two arm members.

BRIEF DESCRIPTION OF THE DRAWINGS

Now the present invention is described in the following with reference to the appended drawings, in which:

FIG. 2b is a sectional view taken along line IIb—IIb of FIG. 2a;

FIG. 3 is a bottom view of the assembly shown in FIG. 2a;

DETAILED DESCRIPTION OF THE PREFERRED EMBODIMENTS

Figure 1:
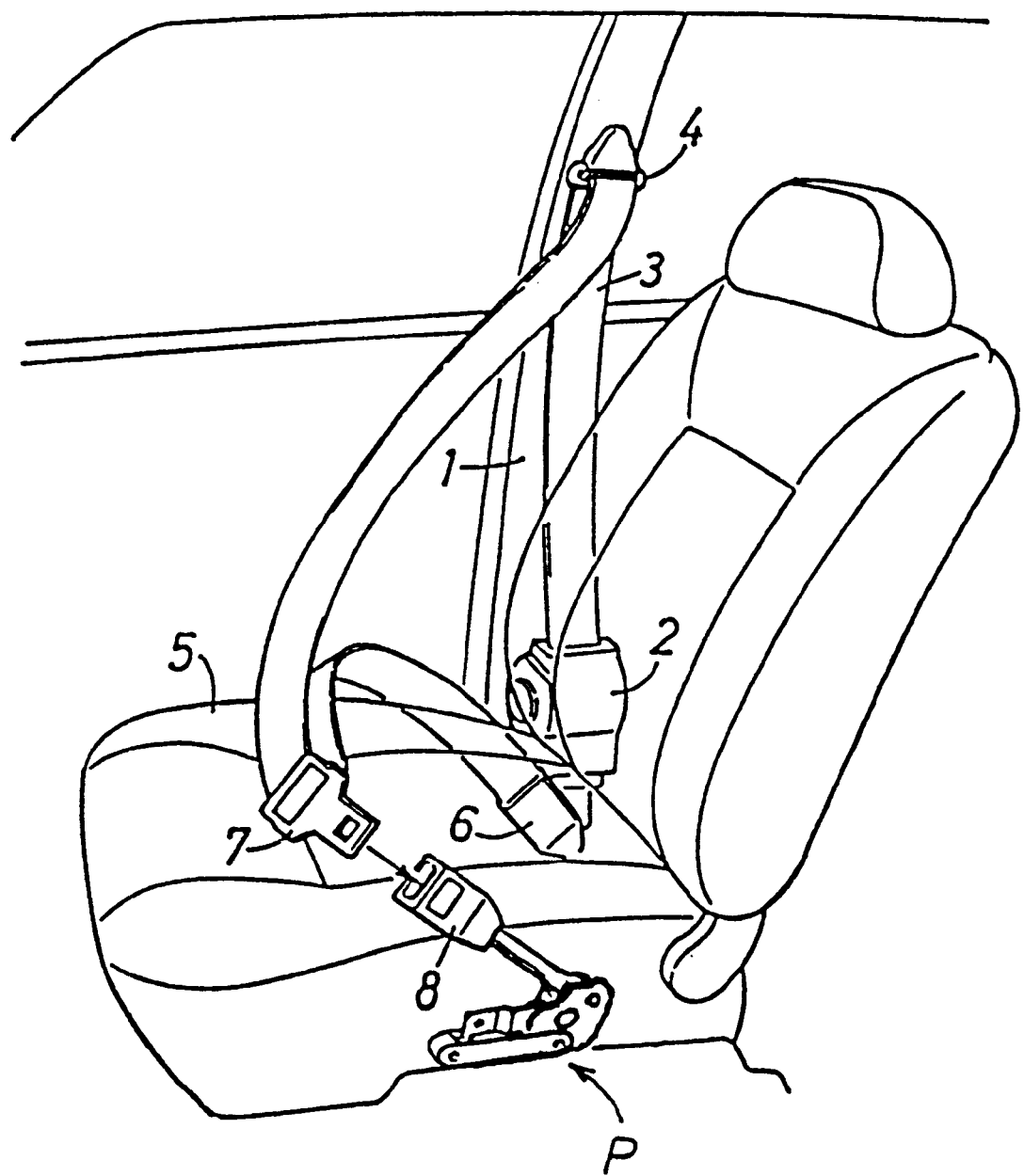
FIG. 1 is a perspective view showing the seat to which the present invention is applied.

FIG. 1 generally shows an automotive seat to which the present invention is applied. Referring to FIG. 1, a seat belt 3 which extends upward from an ELR device 2, secured to a lower part of a center pillar 1 of a passenger compartment of a vehicle, is passed through a through ring 4 attached to an upper part of the center pillar 1, and has an end portion 6 which is secured to a side of a rear part of the seat 5. The part of the seat belt 3 extending between the through ring 4 and the end portion 6 carries a tongue plate 7 which is slidable along the length of the seat belt 3. The side of the seat facing away from the part to which the seat belt end portion 6 is attached is provided with a buckle 8 via a pre-tensioner assembly P according to the present invention.

When a vehicle occupant is seated in the seat 5, the seat belt 3 is pulled out from the ELR device 2, and the tongue plate 7 is latched to the buckle 8 with the result that the seat belt 3 is passed across the chest of the vehicle occupant from the shoulder to the waist.

Figure 2A:
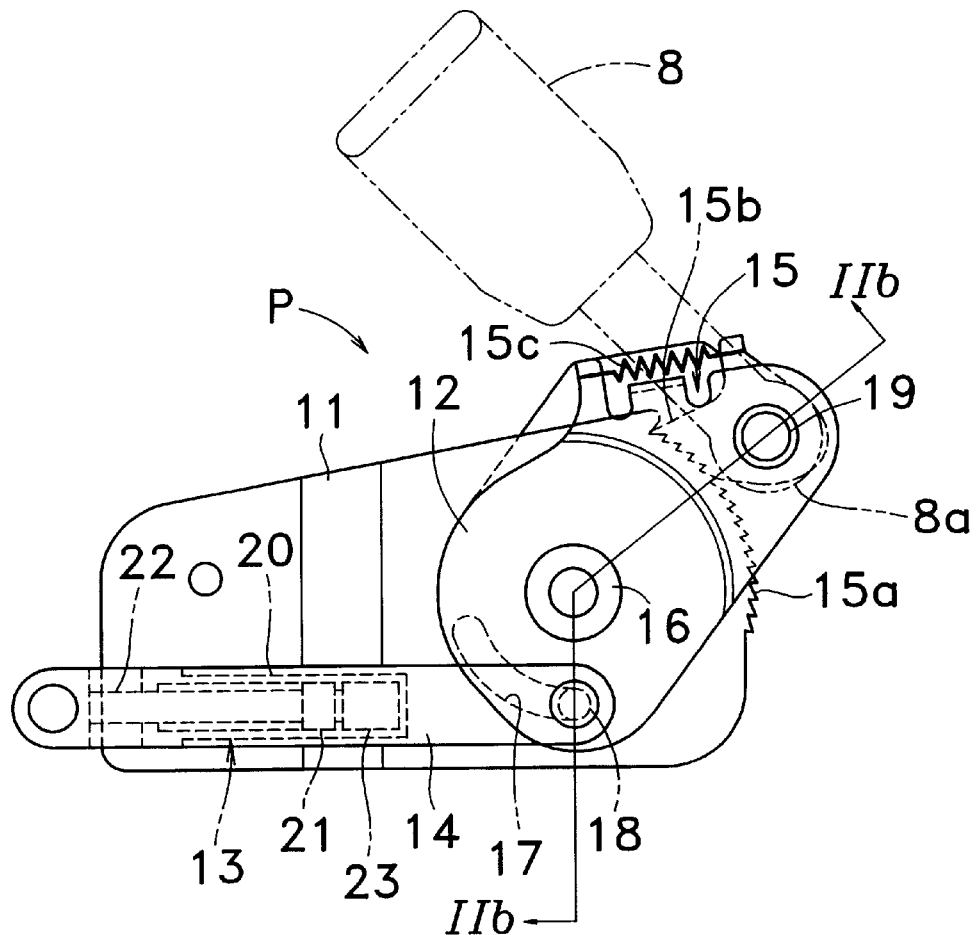
FIG. 2a is a side view of a first embodiment of the present invention.
Figure 3:
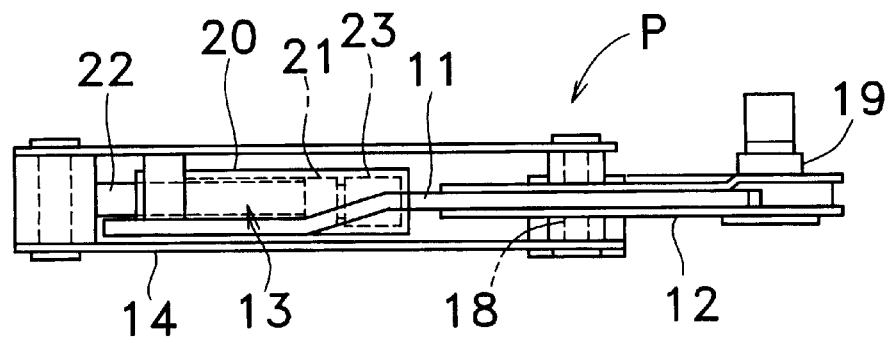
Figure 2B:
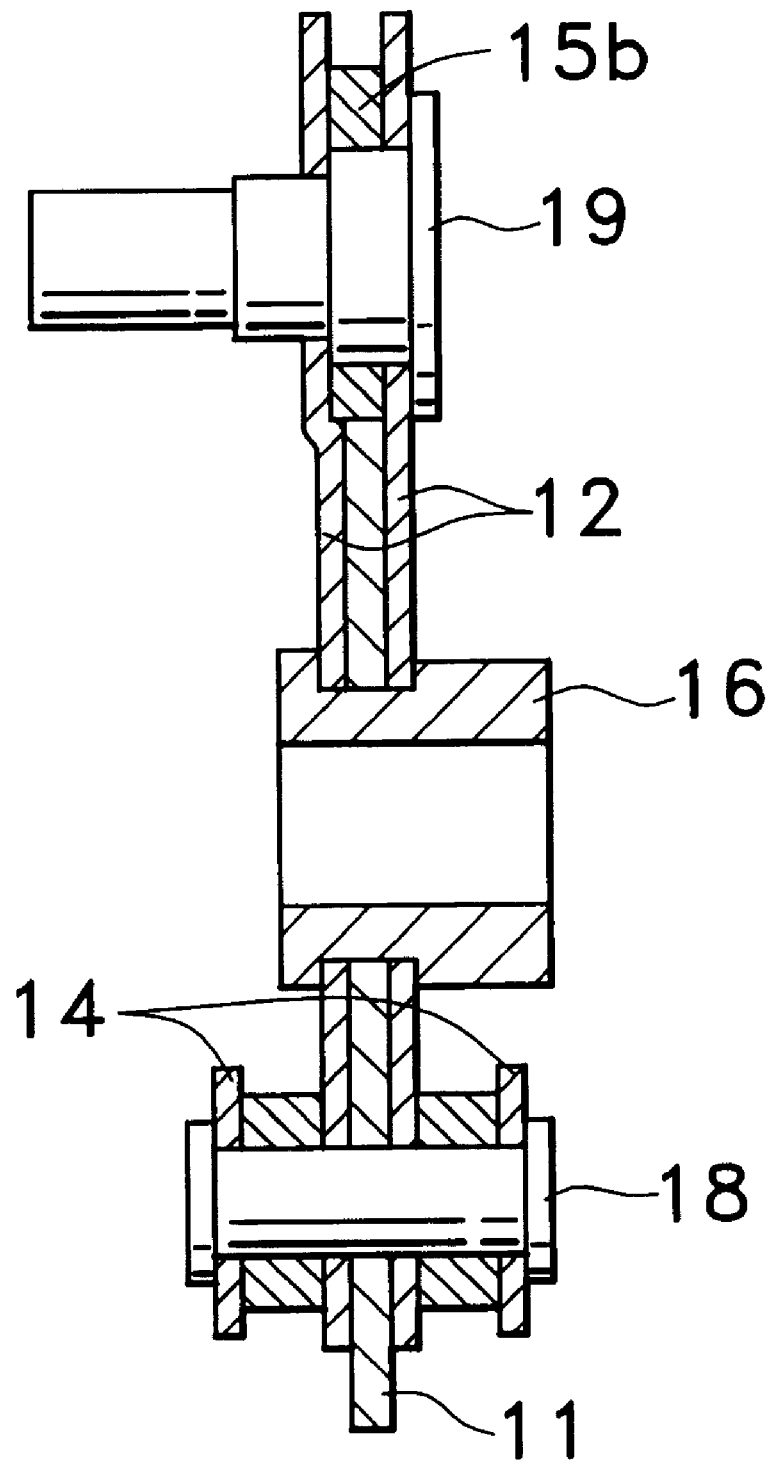

The pre-tensioner assembly P is designed to automatically increase the tension of the seat belt 3 in case of a vehicle crash or the like. As shown in FIGS. 2a, 2b and 3, the assembly comprises a base plate 11 for securing the assembly to a side of the vehicle seat 5, an arm 12 having one end which is pivotally attached to the base plate 11 and another end fixedly carrying an anchor portion 8a of the buckle 8, a linear actuator 13 attached to the base plate 11, a pair of link members 14 extending in parallel with each other, and having one end which is connected to a working end of the linear actuator 13 and another end which is connected to a part of the arm 12 radially spaced from the pivot center thereof, and a reversal preventing device 15 for permitting the rotation of the arm only in one direction.

The base plate 11 is provided with a hollow center shaft 16 for rotatably supporting the arm 12, and an arcuate slot 17 for passing through a pin 18 connecting the other end of the link members 14 with the arm 12. A sector gear 15a having saw-tooth shaped teeth is formed in the base plate 11 centered around the center shaft 16. The base plate 11 may be attached to a side of a vehicle seat by passing a pair of threaded bolts on through the central bore of the hollow center shaft 16 and an opening provided in the base plate 11. It is highly advantageous to secure the assembly at the pivot center of the arm so that any undue moment will not be applied to the base plate 11.

The arm 12 is formed by a pair of members interposing the base plate 11 therebetween, and has one end which is rotatably supported by the center shaft 16 and another end which carries an anchor pin 19 attached thereto by projection welding or the like. A ratchet or pawl 15b adapted to engage the sector gear 15a is rotatably supported by the anchor pin 19 between the two members of the arm 12. The anchor portion 8a of the buckle 8 may also be interposed between the two arm members similarly to the ratchet member 15b.

The ratchet member 15b is normally urged into engagement with the sector gear 15a by a tension coil spring 15c extending between the pawl member 15b and the arm 12. The sector gear 15a, the pawl member 15b and the tension coil spring 15c jointly form the reversal preventing device 15 as a ratchet mechanism.

Figure 4:
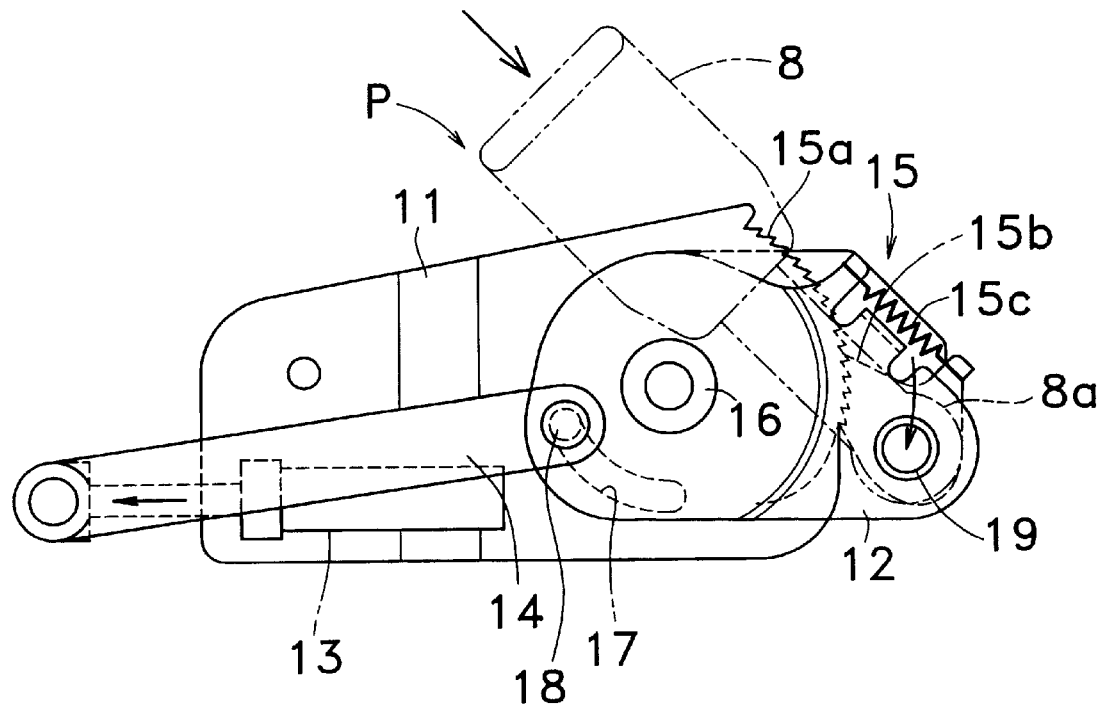
FIG. 4 is a side view similar to FIG. 2a showing the state of the assembly when it is activated.

The actuator 13 comprises a cylinder 20 fixedly secured to the base plate 11, a piston 21 slidably received in the cylinder 20, a piston rod 22 integrally connected to the piston 21, and a propellant 23 (gas generating agent) placed in a bottom end of the cylinder 20. When a vehicle crash is detected by a deceleration sensor (not shown in the drawing), the propellant 23 is ignited and the piston 21 is pushed out by the pressure of the resulting combustion gas. The thrust of the piston 21 is transmitted, via the link members 14 attached to an end of the piston rod 22, to the arm 12 so that the arm 12 is angularly actuated, and the buckle 8 is pulled in (see FIG. 4). This in turn applies a tension to the seat belt 3, and the vehicle occupant is thereby positively restrained. At this point, because the ratchet member 15b prevents the reversal of the arm 12 by engaging with the sector gear 15a, even after the pressure of the combustion gas has been lost, the seat belt 3 would not slack or yield by itself.

In the present embodiment, because the piston rod 22 and the arm 12 are joined by the link members 14, the position of the actuator 13 can be freely selected while preserving the required rigidity of the linking arrangement. Also, because the pin 18 connecting the arm 12 with the link members 14 is guided by the arcuate slot 17 formed in the base plate 11, and the range of the angular movement of the arm 12 is defined by this slot 17, the manufacturing errors of the arm 12, the actuator 13 and the link members 14 would not affect the range of the angular movement of the arm 12. Therefore, any error in the relation between the pulling stroke of the buckle 8 and the range of the angular movement of the arm 12 can be minimized, and the reliability of the operation of the assembly can be improved.

Figure 5:
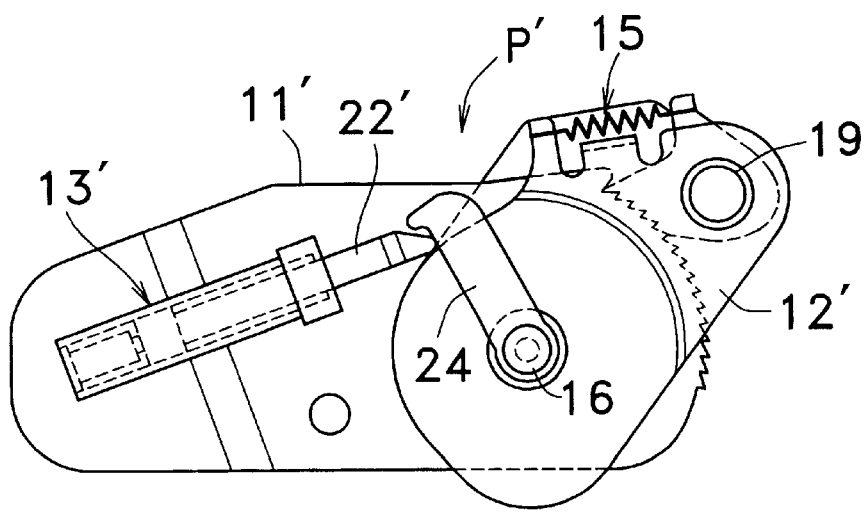
FIG. 5 is a side view of a second embodiment of the present invention.
Figure 6:
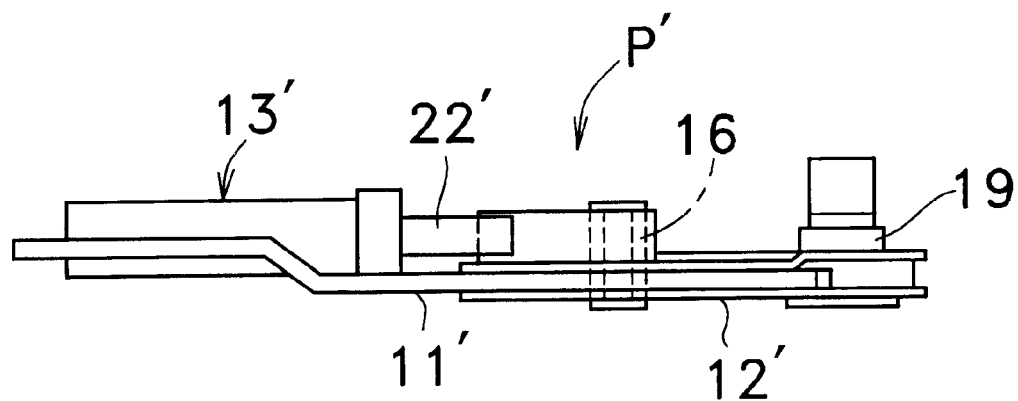
FIG. 6 is a bottom view of the assembly shown in FIG. 5.
Figure 7:
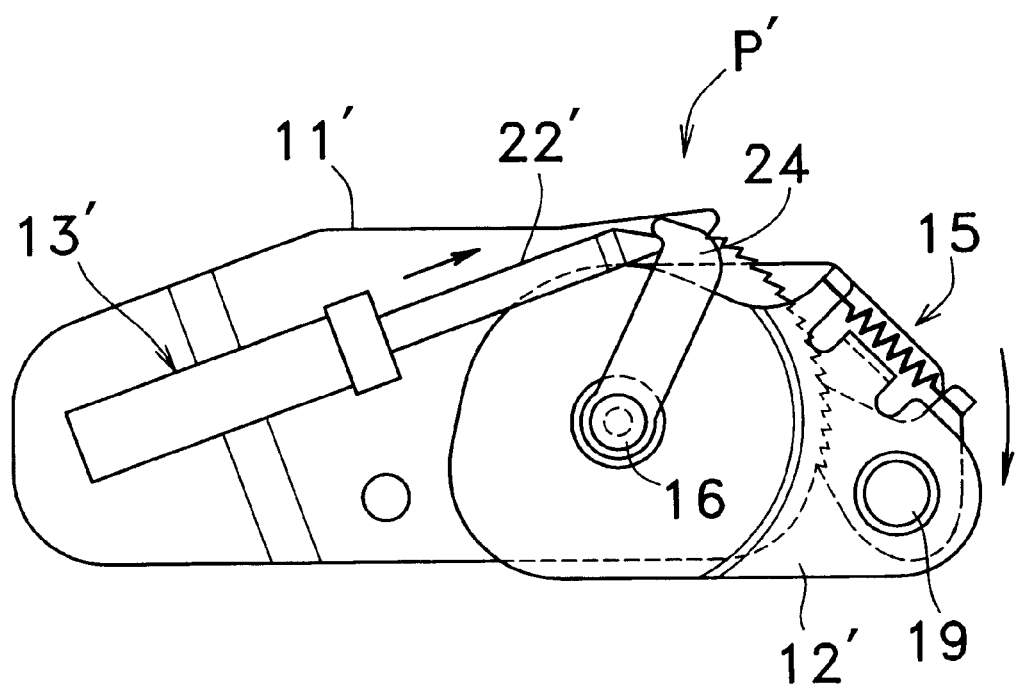
FIG. 7 is a side view similar to FIG. 5 showing the state of the assembly when it is activated.

FIGS. 5 to 7 show a second embodiment P' of the present invention. Whereas the link members 14 were pulled by the thrust of the piston 21 to rotate the arm in the first embodiment, the second embodiment provides a projection 24 at a part of the arm 12 radially spaced from the pivoted center so that the free end of the piston rod 22' of actuator 13' abuts and pushes the projection 24 and the arm 12 is directly rotated by the thrust of the piston. Otherwise, the basic arrangement of the second embodiment is similar to that of the first embodiment. The second embodiment eliminates the need for the link members 14, and can simplify the structure of the assembly.

In either of the above described embodiments, it is possible to form the center shaft 16 pivotally supporting the arm 12 or 12' as a part fixedly secured to the frame of the seat 5. Such an arrangement can ensure a sufficient rigidity of the arm 12 or 12' without substantially requiring the rigidity of the base plate 11 or 11' to be increased, and allows the weight of the assembly to be reduced. Obviously, it is also possible to secure the base plate 11 or 11' to the frame of the seat 5 at a plurality of points.

The reversal preventing device 15 is by no means limited by the above described embodiments, and may consist of a one-way clutch having a different structure. The base plate 11, the arm 12 and the link members 14 are also not limited by the above described embodiments, and can be implemented in various other ways.

According to the above described embodiments, because the force for pulling the seat belt is produced by a rotary mechanism which joins a linear actuator with a buckle by using a link mechanism in a highly rigid manner, the resistance to the operation of the actuator is substantially reduced as compared to the conventional arrangement using wire for pulling the seat belt. Furthermore, because the actuating force is produced by the stroke of the piston rod which pushes the piston rod out of the cylinder, it is possible to maximize the pressure receiving surface of the piston. Therefore, the operating efficiency of the actuator can be improved. This in turn allows the required amount of the propellant for producing the power for the actuator to be reduced so that the ill effects arising from the use of the gas can be minimized, and the size and weight of the assembly can be reduced. Also, the cost of the assembly can be reduced. In particular, because the width of the assembly can be reduced, the freedom in installing the assembly to the seat can be increased.

Figure 8:
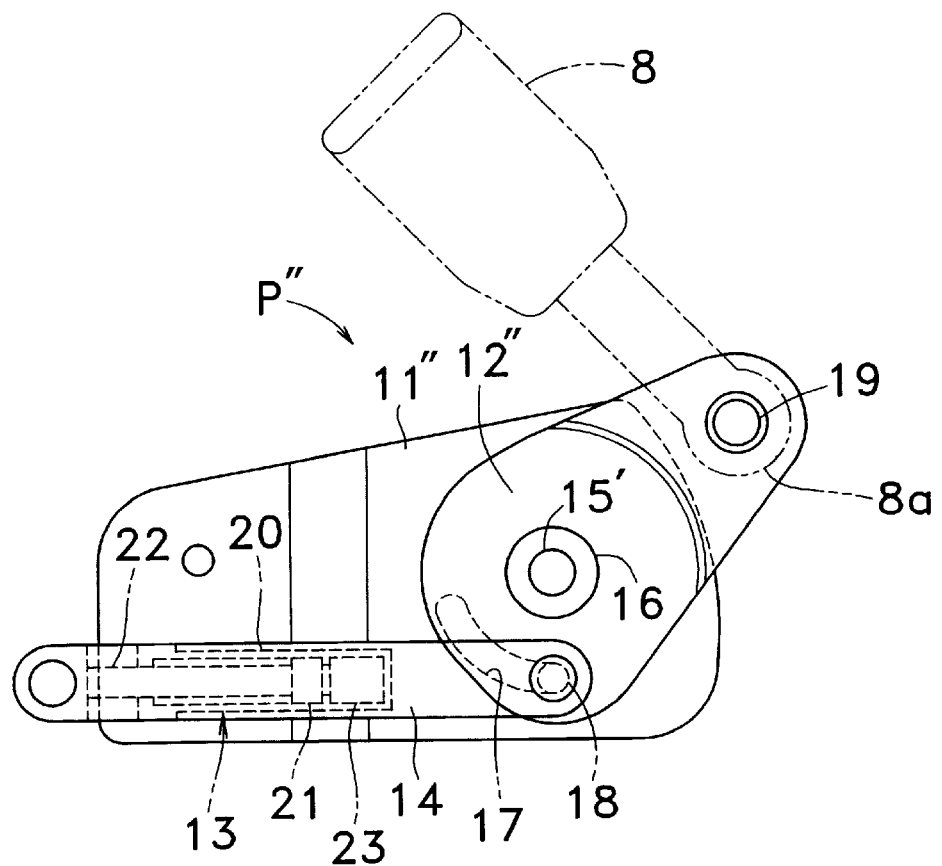
FIG. 8 is a side view of a third embodiment of the present invention.
Figure 9:
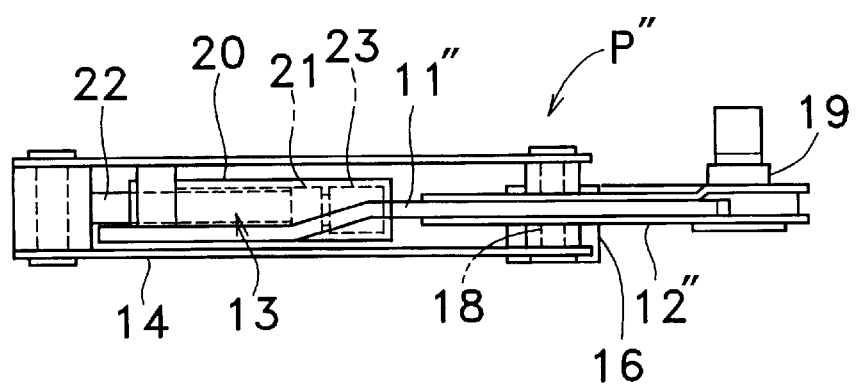
FIG. 9 is a bottom view of the assembly shown in FIG. 8.
Figure 10:
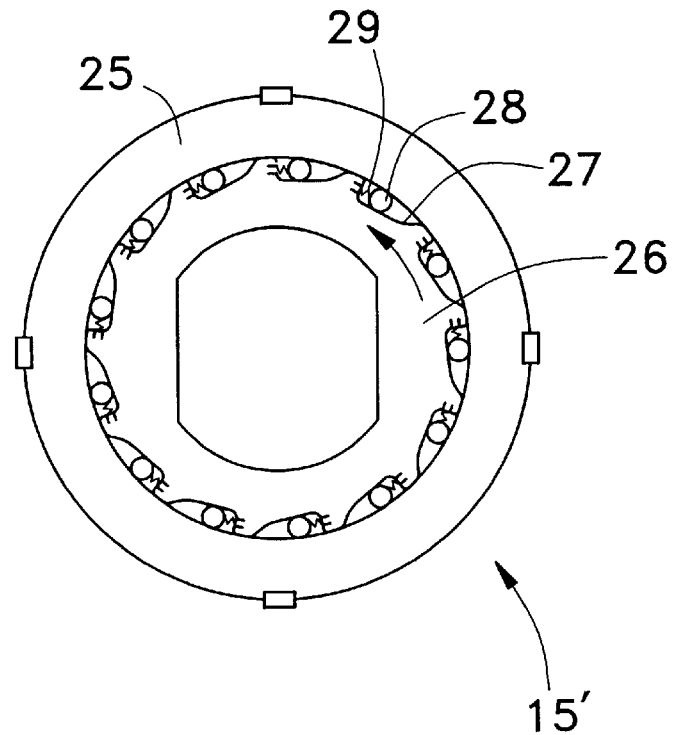
FIG. 10 is an enlarged view of the one-way clutch used in the third embodiment.

FIGS. 8 and 9 show a third embodiment of the present invention. This pre-tensioner assembly P" is designed not only to automatically increase the tension of the seat belt 3 but also to control the tension at an acceptable level in case of a vehicle crash or the like. The parts corresponding to those of the previous embodiments are denoted with like numerals. As illustrated in FIGS. 8 and 9, the assembly comprises a one-way clutch 15' which is shown in FIG. 10 in an enlarged scale, instead of the ratchet mechanism employed in the first and second embodiments. The one-way clutch 15' comprises an outer race 25 fixedly secured to the tubular center shaft 16, an inner race 26 fixedly secured to the arm 12, a plurality of rollers 28 received in slots 27 defined on an outer circumference of the inner race 26, and springs 29 for urging the roller 28 in each of the slots 27 in a tangential direction, and is incorporated with a load limiting mechanism as described hereinafter.

Referring to FIG. 11, each of the slots 27 comprises a radial wall surface 27a extending substantially in a radial direction, and an inclined surface 27b which is connected to a base end of the radial wall surface 27a and increases an inclination angle thereof as it extends away from the radial wall surface 27a. In particular, the inclination angle of the inclined surface 27b somewhat sharply increases from an intermediate part thereof.

Figure 11B:
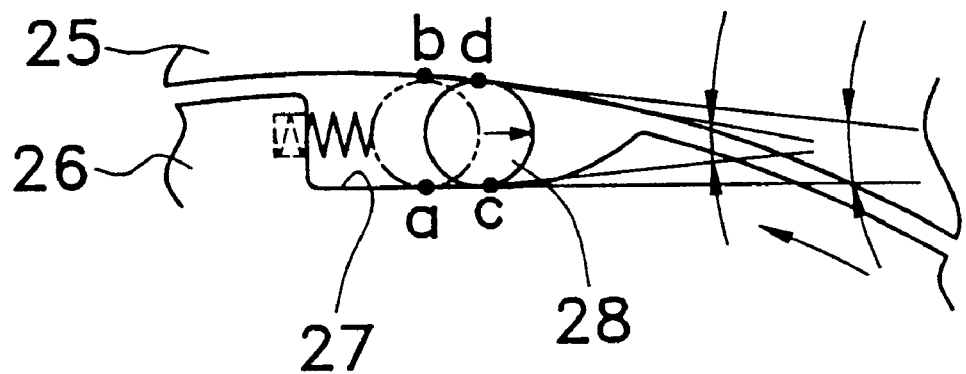
FIG. 11(b) is a similar view similar to FIG. 11(a) showing the mode of operation.
Figure 12:
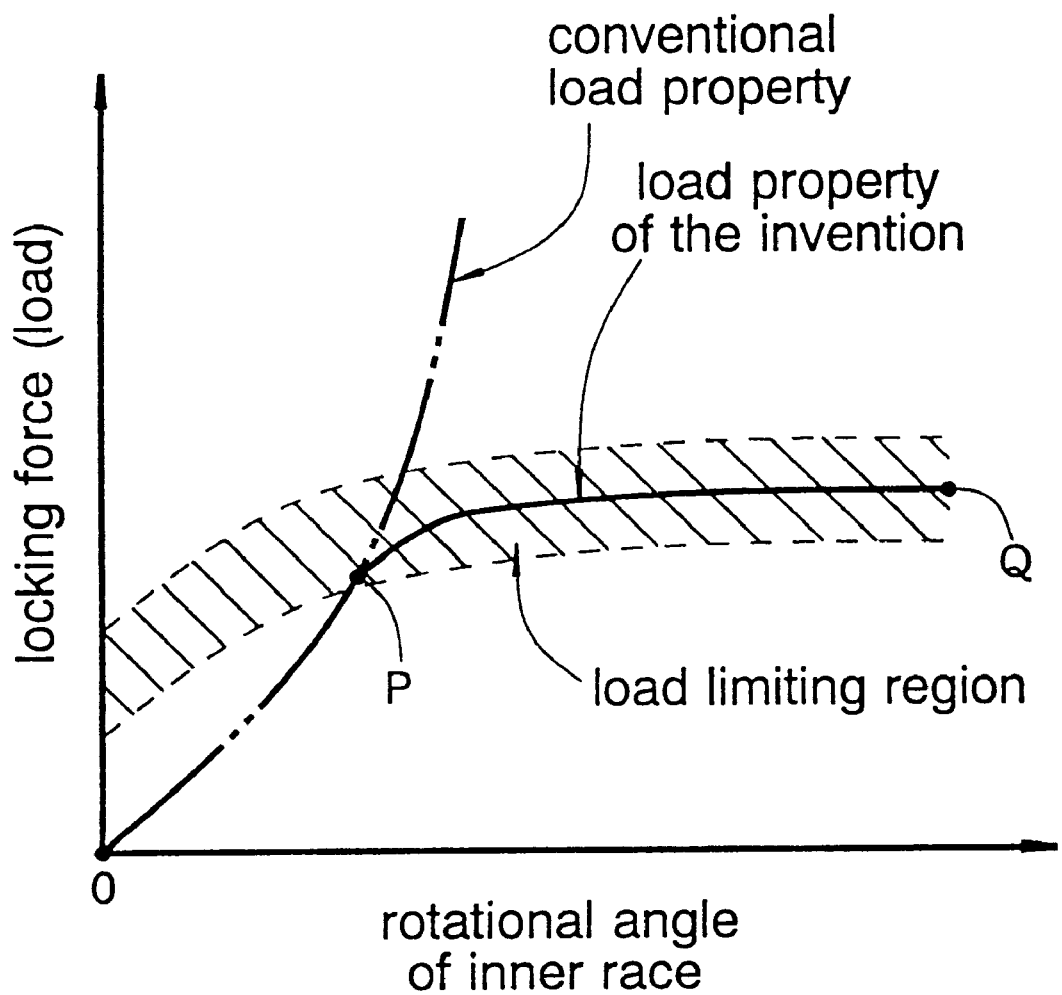
FIG. 12 is a graph showing the load property of the one-way clutch of the present invention.

In case of a vehicle crash, the pre-tensioner device P is activated, and the buckle 8 is pulled in. During this process, the rollers 28 simply freely turn in the space defined between the outer race 25 and the inner race 26. However, once the buckle 8 is subjected to a force which tends to pull it in the direction indicated by an arrow in FIG. 10, each of the rollers 28 moves from a position characterized by contact points a and b to another position characterized by contact points c and d as shown in FIG. 11(b). The pressure angle progressively increases from a value $\alpha_1$ defined by points a and b to a value $\alpha_2$ defined by points c and d. In other words, as shown in FIG. 12, with the rotation of the inner race 26, the load progressively increases until point P is reached. As a force is applied such that the inner race 26 rotates further in the direction indicated by the arrow in FIG. 10, each of the rollers 28 starts slipping at points c and d, and is pushed back to the position indicated by the imaginary lines FIG. 11(b). In other words, as a force is applied so as to rotate the inner race 26 in the direction indicated by the arrow in FIG. 10, the load is kept substantially constant as indicated by the movement from point P to point Q in FIG. 12, and the load property is such that the buckle 8 is gradually pulled out while absorbing the impact of the crash by virtue of the friction between the rollers 28, and the outer race 25 and/or the inner race 26.

Figure 13:
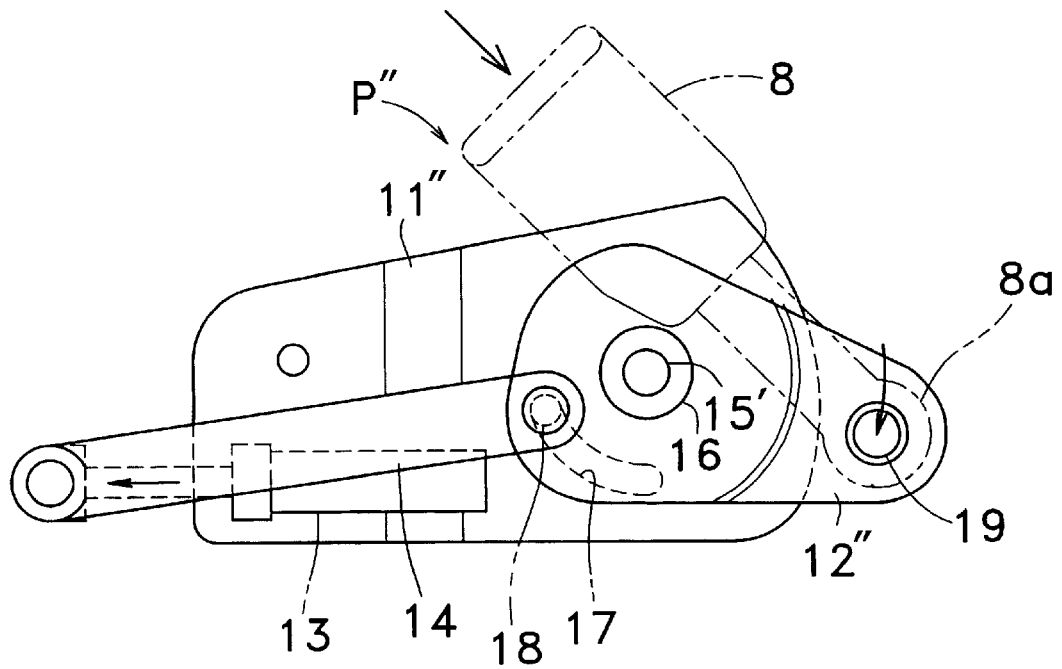
FIG. 13 is a side view similar to FIG. 8 showing the state of the assembly when it is actuated.

Now the mode of operation of this embodiment is described in the following. First of all, when a vehicle crash is detected by a deceleration sensor (not shown in the drawings), the propellant 23 is ignited and the piston 21 is pushed out by the pressure of the resulting combustion gas. The thrust of the piston 21 is transmitted, via the link members 14 attached to an end of the piston rod 22, to the arm 12" so that the arm 12" is angularly actuated, and the buckle 8 is pulled in (see FIG. 13). This in turn applies a tension to the seat belt 3, and the vehicle occupant is thereby positively restrained. At this point, because the one-way clutch 15' prevents the reversal of the arm 12", even after the pressure of the combustion gas has been lost, the seat belt 3 would not slack or yield by itself. At the same time, the load limiting mechanism incorporated in the one-way clutch 15' prevents any excessive load from being applied to the vehicle occupant.

Figure 11A:
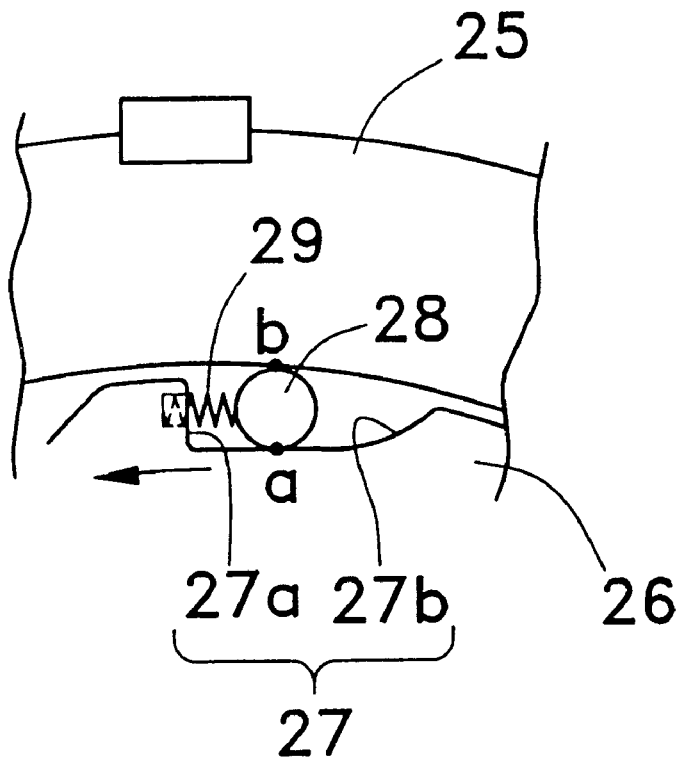
FIG. 11(a) is an enlarged view of a part of FIG. 10.
Figure 14A:
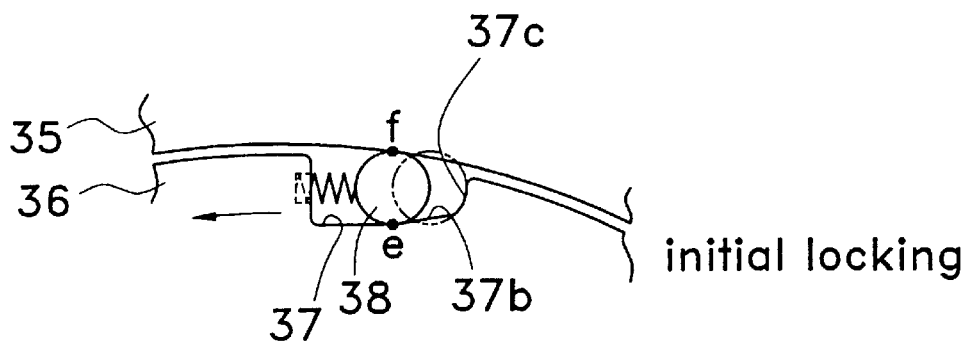
FIGS. 14(a) to 14(c) are views similar to FIG. 11(a) showing the mode of operation of a fourth embodiment.
Figure 14B:
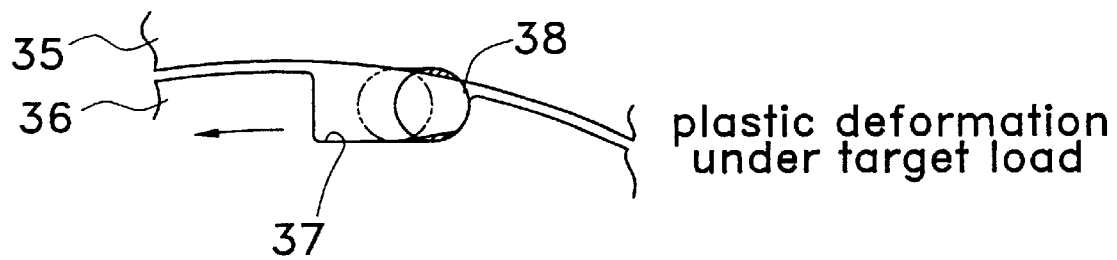
Figure 14C:
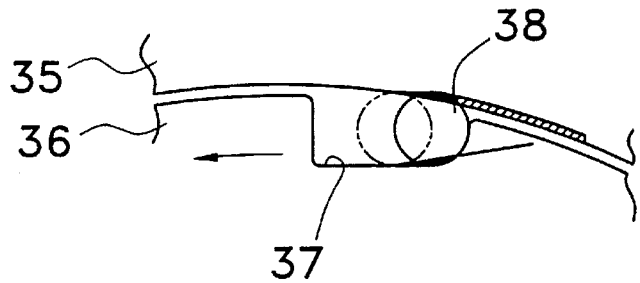

FIGS. 14(a) to (c) are views similar to FIGS. 11(a) and (b) showing a fourth embodiment of the present invention, and the parts corresponding to those of the previous embodiment are denoted with like numerals. In this embodiment, balls 38 are used in the one-way clutch 15', instead of the rollers 28, and the shape of the slots 37 of the inner race 36 is changed from that used in the third embodiment, but a similar load property as shown in FIG. 12 can be obtained.

In this embodiment, each of the balls 38 initially makes point contact with the outer race 35 and the inner race 36 at points e and f. As the outer race 36 rotates in the direction indicated by an arrow in FIG. 14(a), the shaded region in FIG. 14(b) starts undergoing a plastic deformation once point P in FIG. 12 is reached. This is achieved by appropriately adjusting the inclination angle of the inclined surface 37b of the slot 37. As a force is applied so as to rotate the inner race 36 in the direction indicated by an arrow in FIG. 14(a), and each of the balls 38 turns, the ball 38 is eventually engaged by the stopper surface 37c of the slot 37, and is thereby prevented from any further movement. Thereafter, the shaded region of the outer race 35 is plastically deformed, and this produces a substantially constant resistance to the force which tends to turn the inner race 36 in the direction indicated by the arrow relative to the outer race 35 as indicated by the movement from point P to point Q in FIG. 12. This resistance is applied against the force which tends to extend the seat belt, typically by the inertial movement of the vehicle occupant in case of a vehicle crash.

Figure 15A:
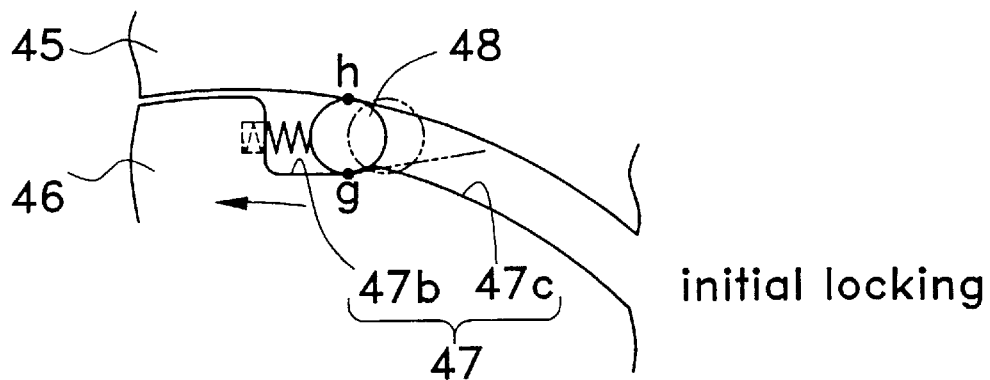
FIGS. 15(a) to 15(c) are views similar to FIG. 11(a) showing the mode of operation of an embodiment slightly modified from the fourth embodiment.
Figure 15B:
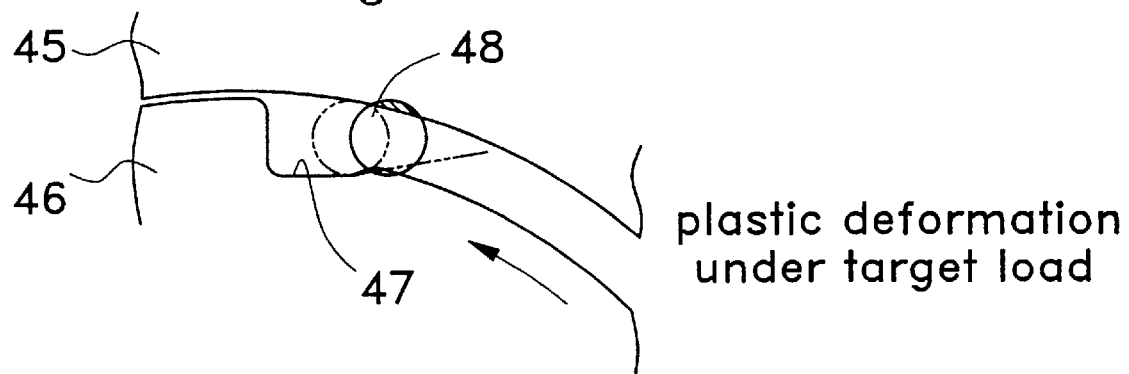
Figure 15C:
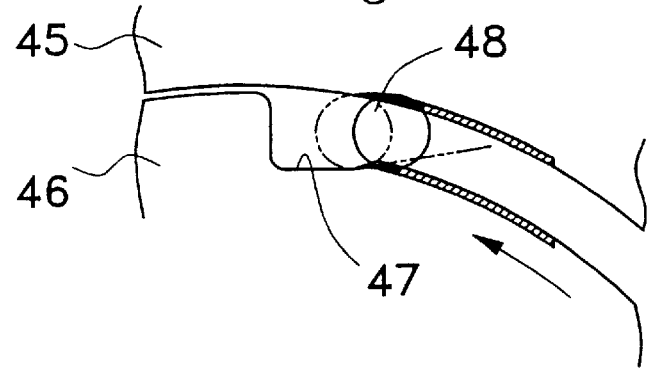

FIGS. 15(a) to (c) are views similar to FIGS. 14(a) to (c) showing a fifth embodiment of the present invention, and the parts corresponding to those of the previous embodiments are denoted with like numerals. In this embodiment, the shape of the slots 47 of the inner race 46 is changed from those of the third and fourth embodiments, but a load property similar to that shown in FIG. 12 can be obtained. The slot 47 is provided with an inclined surface 47b which progressive increases its inclination angle up to an intermediate point thereof, but defines a surface 47c which extends in parallel with an inner circumferential surface of the outer race 45 in a rear end thereof or in the right hand side of FIG. 15(a).

In this embodiment also, each of the balls 48 initially makes point contact with the outer race 45 and the inner race 46 at points g and h. As the inner race 46 rotates in the direction indicated by an arrow in FIG. 15(a), the shaded region in FIG. 15(b) starts undergoing a plastic deformation when point P in FIG. 12 is reached. This is achieved by appropriately adjusting the inclination angle of the inclined surface 47b of the slot 47. As a force is applied so as to rotate the inner race 46 in the direction indicated by the arrow in FIG. 15(a), the balls 48 turn, the shaded regions of the outer race 45 and the inner race 46 are plastically deformed, and the load is kept substantially constant as indicated by the movement from point P to point Q in FIG. 12.

It is obvious that the present invention is not limited by the above described embodiments. For instance, the arrangements as shown in FIGS. 10, 11(a) and 11(b) can be formed by using balls instead of rollers, and the inner race may be kept stationary while the outer race rotates. It is also possible to provide a reversal preventing device incorporated with a linear load limiting mechanism between the base plate 11 and the link members 14 of FIG. 8. Further, instead of a force produced by combustion of a propellant in a cylinder and piston arrangement, a resilient force of a spring member may be used as a power source of the pre-tensioner assembly for pulling the seat belt or the buckle, and the pre-tensioner assembly may be provided on the side of the ELR device, instead of the side of the buckle. Additionally, the one-way clutch of the present invention may be applied to a seat recliner, instead of a seat belt pre-tensioner assembly, so that the seat is normally locked up in a prescribed position, but is allowed to gradually recline in case of a vehicle crash so as to absorb the impact of the crash. In this case, the shape of the slot can be adjusted so as to control the reclining angle which is produced by the load limiting mechanism.

According to the above described embodiments, a roller or a ball is received in each of slots defined between a pair of relatively moving members, each slot being provided with an inclining wall which progressively reduces the width of the slot, and the rollers or the balls are urged toward the narrower parts of the slots. A load limiting mechanism is formed by adjusting the shape and/or the inclination angle of the inclined surface of the slot so that no special components are required, and the structure of the mechanism is made both simple and compact. When the one-way clutch is applied to a seat belt pre-tensioner assembly, the impact of a vehicle crash to the vehicle occupant can be absorbed without reducing the capability to restrain the vehicle occupant.

Although the present invention has been described in terms of preferred embodiments thereof, it is obvious to a person skilled in the art that various alterations and modifications are possible without departing from the scope of the present invention which is set forth in the appended claims.

What we claim is:

1. A pre-tensioner assembly for automatically increasing a tension of a seat belt in case of a vehicle crash, comprising:

a base plate for securing the entire assembly to a part near a side of a seat;

an arm having one end pivotally attached to said base plate at a pivot center and another end attached to a part of a seat belt;

a cylinder and piston device attached to said base plate and adapted to rotate said arm from a rest position to an operative position;

a reversal preventing device for restricting a rotational direction of said arm to be from said rest position to said operative position;

wherein said cylinder and piston device comprises a linear cylinder having a propellant placed in a bottom end thereof;

wherein said cylinder and piston device further comprises a piston slidably received in said cylinder, said cylinder and piston device having a working end connected to a part of said arm radially spaced from said pivot center of said arm; and wherein said working end is connected to said radially spaced part of said arm via a link member which is pivotally attached to both said arm and said working end of said piston so that said link member transmits a tensile force from said working end to said radially spaced part of said arm.

2. A seat belt pre-tensioner assembly according to claim 1, wherein said cylinder is attached to said base plate, and said link comprises a pair of link members which extend along either sideof said base plate.

3. A seat belt pre-tensioner assembly according to claim 2, wherein a pin pivotally joining said arm to said link members is engaged by an arcuate slot formed in said base plate.

4. A seat belt pre-tensioner assembly according to claim 3, wherein said arcuate slot has at least one end which defines an end of a rotational angular range of said arm.

5. A seat belt pre-tensioner assembly according to claim 1, wherein said reversal preventing device comprises sawtooth shaped teeth formed in said base plate concentrically to said pivot center, and a pawl member pivotally attached to said arm and resiliently urged toward said teeth so as to form a ratchet mechanism.

6. A seat belt pre-tensioner assembly according to claim 5, wherein said arm comprises a pair of arm members extending substantially parallel to each other, and said pawl member is pivotally attached to said arm between said pair of arm members.

7. A seat belt pre-tensioner assembly for automatically increasing a tension of a seat belt in case of a vehicle crash, comprising:

a base plate for securing the entire assembly to a part near a side of a seat;

an arm having one end pivotally attached to said base plate at a pivot center and another end attached to a part of a seat belt;

a cylinder and piston device attached to said base plate and adapted to rotate said arm from a rest position to an operative position;

a reversal preventing device for restricting a rotational direction of said arm to be from said rest position to said operative position; and wherein said pivot center comprises a hollow shaft adapted to pass a fastening member therethrough for mounting said base plate to said part near a side of a seat.

* * * * *